United States Patent
Murphy, Jr.

[11] Patent Number: 5,820,645
[45] Date of Patent: Oct. 13, 1998

[54] PLEATABLE NONWOVEN COMPOSITE ARTICLE FOR GAS FILTER MEDIA

[75] Inventor: William F. Murphy, Jr., Wilmington, Del.

[73] Assignee: Reemay, Inc., Old Hickory, Tenn.

[21] Appl. No.: 862,721

[22] Filed: May 23, 1997

[51] Int. Cl.⁶ ..................................................... B32B 7/10
[52] U.S. Cl. ........................... 55/385.3; 55/521; 55/524; 55/527; 55/528; 55/DIG. 45
[58] Field of Search .................... 55/385.3, 521, 55/528, 524, 527, DIG. 45; 428/198, 283, 284

[56] References Cited

U.S. PATENT DOCUMENTS

| | | |
|---|---|---|
| 4,107,364 | 8/1978 | Sisson . |
| 4,257,791 | 3/1981 | Wald . |
| 4,274,914 | 6/1981 | Keith et al. ................................ 55/528 |
| 4,318,774 | 3/1982 | Powell et al. .............................. 55/527 |
| 4,701,197 | 10/1987 | Thornton et al. . |
| 4,714,647 | 12/1987 | Shipp, Jr. et al. . |
| 4,726,901 | 2/1988 | Pall et al. . |
| 4,728,349 | 3/1988 | Oshitari . |
| 4,765,812 | 8/1988 | Homonoff et al. . |
| 4,765,915 | 8/1988 | Diehl . |
| 4,961,974 | 10/1990 | Jones . |
| 5,283,106 | 2/1994 | Seiler et al. ............................... 55/528 |
| 5,290,628 | 3/1994 | Lim et al. ............................. 55/DIG. 2 |
| 5,298,315 | 3/1994 | Fukui et al. . |
| 5,397,632 | 3/1995 | Murphy, Jr. et al. ................... 55/385.3 |
| 5,427,597 | 6/1995 | Osendorf . |
| 5,486,410 | 1/1996 | Groeger et al. ........................... 55/524 |
| 5,496,627 | 3/1996 | Bagrodia et al. . |
| 5,597,645 | 1/1997 | Pike et al. ................................. 55/528 |

*Primary Examiner*—Jay H. Woo
*Assistant Examiner*—Minh-Chau T. Pham
*Attorney, Agent, or Firm*—Bell Seltzer Intellectual Property Law Group of Alston & Bird LLP

[57] ABSTRACT

A composite nonwoven fabric suitable for undergoing pleating to form filtration media includes two nonwoven fabric layers which are adhesively bonded. One layer is an air permeable nonwoven web of continuous filaments. A high loft nonwoven batt of staple fibers is laminated to the nonwoven web layer. The nonwoven batt has a gradient fiber density and includes a first layer of relatively low denier fibers and a second layer of relatively higher denier fibers.

17 Claims, 1 Drawing Sheet

PLEATABLE NONWOVEN COMPOSITE ARTICLE FOR GAS FILTER MEDIA

FIELD OF THE INVENTION

The present invention is directed to a composite nonwoven fabric suitable for use as filtration media.

BACKGROUND OF THE INVENTION

Various kinds of filters utilize nonwoven fabrics as filtration media. Nonwoven fabric materials are frequently used, for example, for automotive air filters, where it is important to remove airborne particles which may be suspended in the combustion air supplied to the automobile engine. Nonwoven fabric structures can be produced which have an open three-dimensional internal structure capable of trapping the solid particles throughout the cross-section of the filtration media, thus allowing the media to effectively filter out particles over an extended useful life.

For example, U.S. Pat. No. 5,397,632 to Murphy, Jr. et al., describes a nonwoven laminated composite article which is capable of undergoing pleating to form a stable pleated gas filtration medium. The pleating procedure provides the filtration medium with a three-dimensional area, thereby increasing its surface area. The filtration medium is a three layered composite nonwoven material which is needle punched to mechanically interconnect and interlock through entanglement of fibers and filaments the various webs forming the composite laminate material. These nonwoven layers include a fully bonded, air permeable, high loft polyester batt, an intermediate web of a substantially unbonded, air permeable continuous filament polyester web, and an outer backside web formed of random continuous filaments which are substantially fully bonded.

Another example of a composite laminate filter material used for particle removal from fluids is U.S. Pat. No. 5,283,106 to Seiler et al. This patent is directed to a multilayered filter specifically for dust collection from gases which includes the combination of two nonwovens to form a laminate material. The multilayer filter material can include a polyethylene terephthalate spunbonded web layer serving as a depth filter and a second fine filter joined to the depth filter by adhesive or welding. The depth filter has a basis weight of from 150 to 500 g/m$^2$, and the filaments have a denier between 4 and 20 dtex. The fine filter has a basis weight of from 30 to 100 g/m$^2$ and the filament denier between 1 and 6 dtex. The webs are subjected to a consolidating treatment such as calendaring or needling or thermal bonding using binders.

SUMMARY OF THE INVENTION

It is an object of present invention to provide a nonwoven filtration medium which can be produced more economically than the aforementioned known nonwoven composite filtration media.

It is also an object of the present invention to provide a filter medium exhibiting excellent particulate removal.

It is a further object of the present invention to provide a filter medium possessing filtering capabilities which maximize its useful life.

It is a further object of the present invention to provide a filter medium which is pleatable and can be used in standard automotive applications.

The present invention achieves these and other objects and advantages by providing a filter medium in the form of a composite nonwoven fabric comprising an air permeable nonwoven web of continuous filaments; an air permeable adhesive coating on one surface of the nonwoven web; and an air permeable nonwoven batt of staple fibers laminated to the nonwoven web by the adhesive coating. The nonwoven batt of staple fibers has a fiber denier gradient and comprises a first layer of relatively low denier fibers laminated to one surface of the spunbonded nonwoven web by the adhesive, and a second layer of relatively higher denier fibers on the opposite surface of the batt and forming an outer exposed surface of the composite nonwoven fabric.

The composite nonwoven fabric has stiffness properties which allow it to be formed into a pleated configuration by standard pleating machinery conventionally used for forming pleated filters. A resin coating may be applied to the web for controlling stiffness and/or air permeability. The filtering capabilities are further enhanced by the composite configuration of the filter medium and its gradient fiber density, which provides effective filtration characteristics throughout the thickness of the filtration medium.

More specifically, the staple fibers of the first layer have a denier per filament of less than 4, e.g. from 1 to 4, and the staple fibers of said second layer have a denier per filament of greater than 4, e.g. from 4 to 15. The nonwoven batt of stable fibers may additionally include a transition layer of staple fibers located between the first layer and second layer, which includes a blend of fibers from said first and second layers. The nonwoven batt thus has a gradient fiber density including a first layer of relatively low denier fibers and a second layer of relatively higher denier fibers. The low denier fiber layer is positioned on the exit side of the batt, i.e., facing the nonwoven web. Accordingly, greater filtration is achieved by enabling the higher density layer to remove the larger particulate from the ingressing gas permitting the low denier layer to sieve the finer particles. This avoids the finer denier layer from contacting larger particulate and increases its efficiency. The composite nonwoven laminate material is particularly beneficial when pleated to increase its surface contact area.

BRIEF DESCRIPTION OF THE DRAWINGS

The foregoing and other objects, features, and advantages of the present invention will be made apparent from the following detailed description of the preferred embodiment of the invention and from the drawings, in which.

DETAILED DESCRIPTION OF THE DRAWINGS

The present invention will now be described more fully in detail with reference to the accompanying drawings, in which preferred embodiments of the invention are shown. This invention should not, however, be construed as limited to the embodiments set forth herein; rather, they are provided so that this disclosure will be thorough and complete and will fully convey the scope of the invention to those skilled in the art.

The composite nonwoven fabric is suitable for undergoing pleating to form a filtration medium. The composite nonwoven fabric is formed from two distinct layers or plies that are joined in a surface to surface relationship by a laminating adhesive. This arrangement enables the composite nonwoven fabric to be produced in a relatively simple manner.

Figure 1:
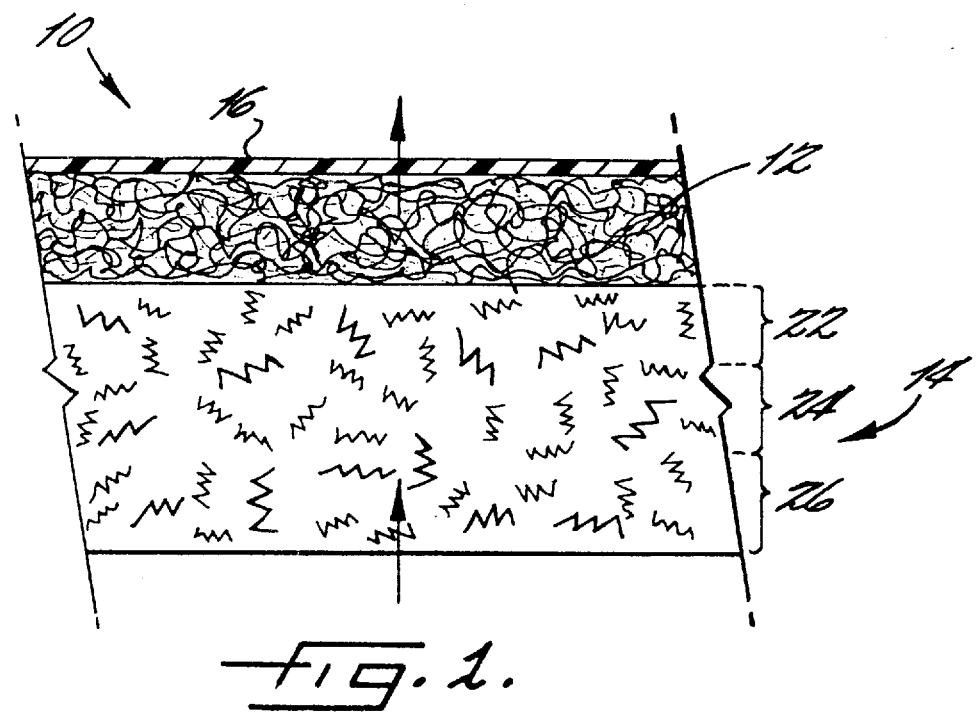
FIG. 1 is an enlarged cross-sectional view of the composite nonwoven fabric.

Referring to FIG. 1, the pleatable composite nonwoven fabric of the present invention is indicated generally by the reference character 10. On the outer back side of the composite fabric is a substantially fully bonded, air permeable nonwoven web 12 formed of continuous filaments. Preferably, the nonwoven web is a spunbonded web and the filaments thereof are randomly deposited to give the web isotropic properties that are nondirectional in nature. Preferably, the filaments are formed of a synthetic fiber forming polymer which is hydrophobic in nature. Among the well known synthetic fiber forming polymers, polyester polymers and copolymers are recognized as being suitable for producing hydrophobic nonwoven webs. The continuous polyester filaments are bonded to each other at points of contact, but the web structure remains sufficiently open to provide the requisite air permeability. The web 12 is considered to be substantially fully bonded in that the filaments are bonded together at a plurality of crossover points. This can be accomplished by any known means, such as by the melting of binding fibers, resin bonding, thermal area bonding, calendering, point bonding, ultrasonic bonding, etc.

One example of a suitable type of air permeable spunbonded nonwoven web of continuous filaments for use in the present invention is a commercially available spunbonded web produced by Reemay Inc. of Old Hickory, Tenn. as style 2040 or T710. The continuous filaments of the spunbonded web 12 are composed of polyethylene terephthalate and are thermally bonded at crossover points through the use of approximately 10% by weight of melted extruded binder fibers consisting of polyethylene isophthalate.

The continuous filaments of the web 12 preferably have a denier per filament of approximately 2 to 5, and the web preferably has a thickness of approximately 15 to 25 mils and a basis weight of approximately 3 to 5 oz./yard$^2$. This web provides support for the nonwoven batt, contributes to filtration, and provides stiffness and shape retention properties needed for pleating. For desirable support and stiffness, it is preferable that the web 12 have a stiffness of 450–750 grams as measured by a Handle-O-Meter. If the web 12 does not have adequate stiffness in its originally manufactured state, a stiffening coating 16 may be applied to one or both surfaces of the web. For example, the outer exposed surface of the web 12 (which is to subsequently form the exit side of the composite nonwoven fabric filtration media) may be provided with a resin coating, indicated at 16, for imparting additional stiffness to the composite nonwoven fabric 10 so that the composite may be pleated by conventional pleating equipment. By varying the amount of resin coating 16 applied to the web 12, the air permeability of the composite nonwoven fabric 10 may also be controlled as required for specific filtration applications. The resin coating 16 may be applied to the web 12 using conventional coating techniques such as spraying, knife coating, reverse roll coating, or the like. Suitable resins include acrylic resin, polyesters, nylons or the like. The resin may be supplied in the form of an aqueous or solvent-based high viscosity liquid or paste, applied to the web 12, e.g. by knife coating, and then dried by heating.

A high-loft air permeable nonwoven batt 14 of staple fibers is laminated to the web 12 by a suitable adhesive. Preferably, the laminating adhesive is applied to the opposite surface of the web 12 from the surface bearing the stiffening coating 16. The laminating adhesive can be one of any known types such as an acrylic, polyester, nylon, etc. One requirement for the adhesive is that it not substantially impede the air permeability of the composite nonwoven fabric. The adhesive coats the filaments present at the surface of the web 12, but does not block or fill the interstices between the filaments, and the web 12 thus retains its air permeability. The laminating adhesive can be applied through the use of known techniques such as knife coating, roll coating, spraying, etc. For example, an aqueous based acrylic adhesive can be gravure roll coated onto the surface of the web 12 and dried with heated air. Subsequently, after the nonwoven batt 14 has been assembled on the surface of web 12, the dried adhesive coating can be thermally activated to bond the nonwoven batt 14 to the web 12. Alternatively, the adhesive may be a sinterable thermoplastic powder which can be heat activated to thereby laminate the nonwoven batt 14 to the web 12.

A light resin coating may also be applied to the exposed surface of the nonwoven batt 14 to provide fiber tie-down, improve abrasion resistance, and thus minimize fuzzing of the surface. Resin coating compositions and techniques which are suitable for use in the present invention are described in commonly-owned U.S. Pat. No. 5,397,632, the disclosure of which is incorporated herein by reference.

The nonwoven batt 14 is comprised of at least two layers of staple fibers of different fiber diameter or denier which form a fiber denier gradient within the batt 14 for achieving desirable filtration properties and providing a relatively high bulk batt. More particularly, the batt 14 comprises an interior layer 22 of relatively low denier fibers laminated to one surface of the nonwoven web 12 by the aforementioned laminating adhesive, and an exterior layer 26 of relatively higher denier fibers on the opposite face of batt 14, which is the upstream-facing or air entrance side of the composite nonwoven fabric 10.

The relatively low denier interior layer 22 is preferably formed of staple fibers having a denier per filament of less than 4, desirably from about 1 to about 4 denier per filament, while the staple fibers of the exterior layer 26 second layer preferably have a denier per filament of greater than 4, desirably from about 4 to about 15. The nonwoven batt 14 may additionally include a transition layer 24 located between the interior and exterior layers which includes a blend of fibers from the interior and exterior layers 22, 26. The exterior layer 26 of staple fibers may be formed by conventional textile processing techniques such as carding or air laying. The lower denier layer 22 can be formed directly onto the higher denier layer, such as by air laying. In so doing, the fibers of the two layers intermingle to form the transition layer 24, which serves to retain the two layers together as a coherent batt 14.

Preferably, the exterior layer 26 is formed from a blend of staple fibers of at least two different deniers. Preferably, the different fibers will be homogeneously blended, albeit not necessarily in equal proportions. For instance, fibers having a range of denier per filament of 5 to 7 may be used in combination with fibers having a denier per filament of from 12 to 18. The proportions of the different filaments within layer 26 may be adjusted to maximize performance. For example, the layer may comprise from 40% to 90% of the lower density filament, e.g., 65%, and 10%–60%, e.g., 35%) of the higher denier filament. In one preferred aspect, the exterior layer 26 includes 55%–70% fibers of 6 denier per filament and 30%–45% of fibers of 15 denier per filament. The basis weight of the layer 26 is preferably between 2.5 to 3.5 oz./yd$^2$, e.g., 2 oz./yd$^2$.

The batt 14 preferably has an overall basis weight of about 2.0 to 4.0 oz/yd$^2$, with the interior layer 22 of lower denier fibers preferably having a basis weight of 0.5–2.0 oz/yd$^2$.

The composite nonwoven fabric 10 preferably has an overall basis weight of 2 to 6 grams per square yard, a thickness of from 80–115 mils, and an air permeability of at least 80 cfm/ft$^2$/min. The composite nonwoven fabric has a stiffness of 450–750 grams as measured by a Handle-O-Meter.

The fibers of the nonwoven batt 14 may be of conventional circular cross-section. Alternatively, by using non-circular cross-section fibers, such as trilobal cross-section fibers, the fiber surface area can be increased, thus allowing for increasing the filtration efficiency for a given basis weight batt, or allowing for using a reduced basis weight batt while maintaining comparable filtration efficiency.

Figure 2:
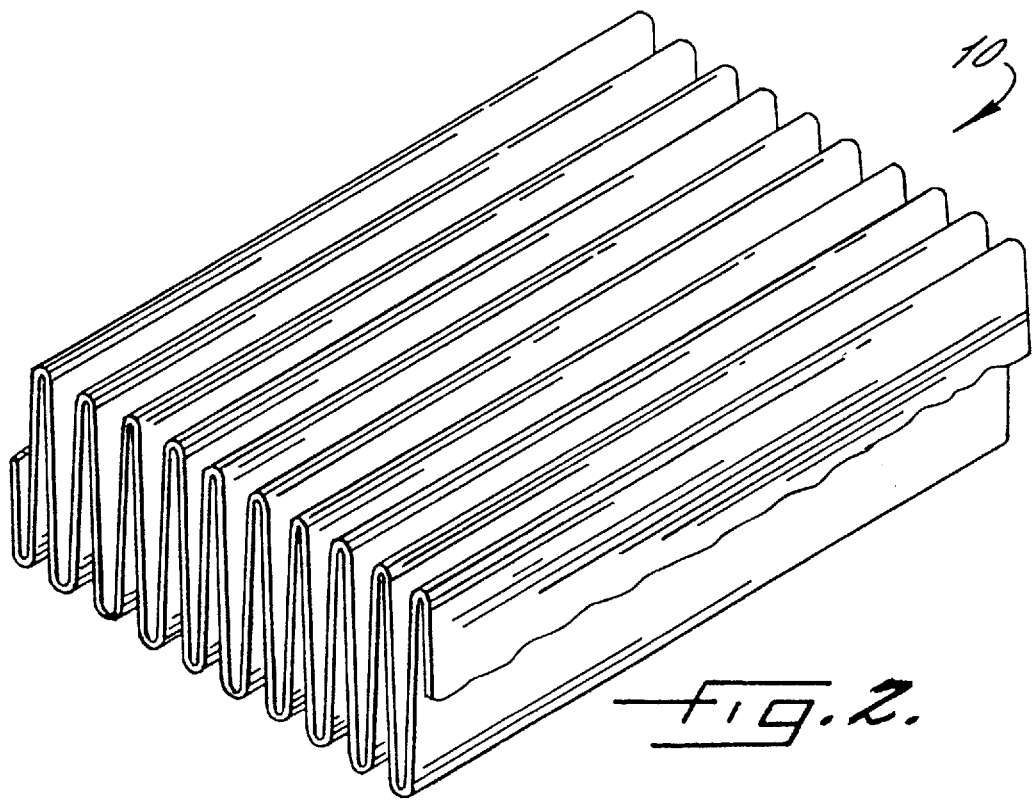
FIG. 2 illustrates a perspective view of a portion of a pleated filtration media having the composite nonwoven fabric according to the present invention.

The nonwoven laminate material 10 may then be pleated as illustrated in FIG. 2. The pleated laminate includes substantially U-shaped undulations which were created while passing at a rate 10 to 15 feet per minute through a conventional pleater apparatus, such as a Chandler pleater. The pleating was carried out without any substantial modification of the air permeability of the laminate material.

The following examples are provided for purposes of further illustrating specific embodiments of the invention. It should be understood however, that the invention is not limited to the specific details given in the example.

EXAMPLE

A 4.0 ounce per square yard spunbonded nonwoven web of polyester continuous filaments (Reemay T-710 from Reemay Inc. of Old Hickory, Tenn.) was coated on one surface with an acrylic resin stiffening coating at a rate of about 0.75 ounces per square yard. The opposite surface of the web was coated with a 0.25 ounce per square yard coating of an acrylic adhesive, and a 3.0 ounce per square yard staple fiber batt was laminated to the spunbonded web. The staple fiber batt was composed of an upper layer of a blend of 6 and 15 dpf (denier per filament) staple fibers, and a bottom layer of 1.0 to 1.5 dpf fibers. The batt was laminated to the spunbonded web with the finer denier fiber layer toward the spunbonded web.

This composite was pleated on a standard pleater and a frame was injection molded around the pleated composite to give the necessary shape retention to the filter unit. The filtration performance of this filter was evaluated and compared to a specification for a commercially available automotive air filter, with the following results:

|  | Actual | Minimum Spec. |
| --- | --- | --- |
| Dust Capacity | 132 grams | 100 grams |
| Initial efficiency | 98.8% | 96.0% |
| Final efficiency | 99.3% | 98.0% |

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

That which is claimed:

1. A composite nonwoven fabric suitable for undergoing pleating to form filtration media, said fabric comprising:

an air permeable nonwoven web of continuous filaments;

an air permeable adhesive coating on one surface of said web; and an air permeable nonwoven batt of staple fibers laminated to said one surface of said nonwoven web by said adhesive coating;

said nonwoven batt of staple fibers having a fiber denier gradient and comprising a first layer of relatively low denier fibers laminated to said one surface of said nonwoven web by said adhesive, and a second layer of relatively higher denier fibers on the opposite surface of said batt and forming an outer exposed surface of the composite nonwoven fabric.

2. A composite nonwoven fabric according to claim 1, additionally including a resin stiffening coating on the surface of said nonwoven web opposite said one surface having said adhesive coating.

3. A composite nonwoven fabric according to claim 1 wherein said composite has a basis weight of 2 to 6 ounces per square yard and an air permeability of at least 80 cfm/ft$^2$/min.

4. A composite nonwoven fabric according to claim 1 wherein said composite fabric has a stiffness of 450–750 grams as determined by a Handle-O-Meter.

5. A nonwoven composite fabric according to claim 1 wherein said nonwoven web is a spunbonded web formed of randomly disposed bonded continuous filaments.

6. A nonwoven composite fabric according to claim 5 wherein said spunbonded nonwoven web has a basis weight of 3 to 5 oz./yd$^2$.

7. A composite fabric according to claim 1 wherein the staple fibers of said first layer have a denier per filament of less than 4 and the staple fibers of said second layer have a denier per filament of greater than 4.

8. The composite fabric according to claim 7 wherein the staple fibers of said first layer have a denier per filament of from 1 to 4 and the staple fibers of said second layer have a denier per filament of 4 to 15.

9. The composite fabric according to claim 7 wherein said nonwoven batt of stable fibers additionally includes a transition layer of staple fibers located between said first layer and said second layer, said transition layer including a blend of fibers from said first and second layers.

10. The composite fabric according to claim 1 wherein the staple fibers of said second layer include a homogeneous blend of fibers of at least two different deniers.

11. The composite fabric according to claim 10 wherein said second layer includes 55%–70% fibers of six denier per filament and 30%–45% of fibers of 15 denier per filament.

12. The composite fabric according to claim 1 wherein said first layer of staple fibers has a basis weight of 0.5–2.0 oz yd$^2$ and the fibers of said first layer have a denier per filament of from 1.0 to 2.25.

13. A pleated filtration medium formed from the composite nonwoven fabric of claim 1.

14. A composite nonwoven fabric suitable for undergoing pleating to form filtration media, said composite fabric having a basis weight from 2.0 to 6.0 oz/yd$^2$ and a thickness of from 80–115 mils. and an air permeability of 80–110 cfm/ft$^2$ min, said fabric comprising an air permeable spunbonded nonwoven web of continuous filaments;

an air permeable resin stiffening coating on one surface of said spunbonded web;

an air permeable adhesive coating on the opposite surface of said spunbonded web;

an air permeable nonwoven batt of staple fibers laminated to said spunbonded nonwoven web by said adhesive coating;

said nonwoven batt of staple fibers having a fiber denier gradient and comprising a first layer of relatively low denier staple fibers and a second layer of relatively higher denier fibers, said second layer of fibers defining the outer exposed surface of the composite nonwoven fabric.

15. The composite fabric according to claim 14 wherein said nonwoven batt of stable fibers additionally includes a transition layer of staple fibers located between said first layer and said second layer, said transition layer including a blend of fibers from said first and second layers.

16. The composite fabric according to claim 15 wherein the staple fibers of said second layer include a homogeneous blend of fibers of at least two different deniers.

17. A composite nonwoven fabric suitable for undergoing pleating to form filtration media, said composite fabric having a basis weight from 2.0 to 6.0 oz/yd$^2$ and a thickness of from 90–115 mils. and an air permeability of 80–110 cfm/ft$^2$ min, said fabric comprising an air permeable isotropic spunbonded nonwoven web formed of randomly deposited bonded continuous polyester filaments;

an air permeable resin stiffening coating on one surface of said spunbonded web;

an air permeable adhesive coating on the opposite surface of said spunbonded web; and an air permeable nonwoven batt of staple fibers laminated to said spunbonded nonwoven web by said adhesive coating;

said nonwoven batt of staple fibers having a fiber denier gradient and comprising a first layer of staple polyester fibers having a denier per filament of 1.0 to 2.25, said first layer being laminated to said one surface of said spunbonded nonwoven web by said adhesive, and a second layer of staple polyester fibers having a denier per filament of from 4 to 15, said second layer of fibers forming the opposite surface of said batt and defining an outer exposed surface of the composite nonwoven fabric.

* * * * *